United States Patent [19]
Beller

[11] 3,920,903
[45] Nov. 18, 1975

[54] SPEECH-TRAINING DEVICE
[76] Inventor: Isi Beller, 98bis, Boulevard Haussmann, 75008 Paris, France
[22] Filed: July 31, 1973
[21] Appl. No.: 384,179

[30] Foreign Application Priority Data
July 31, 1972 France .............................. 72.27589
Dec. 15, 1972 France .............................. 72.44921

[52] U.S. Cl. ................................ 179/1 D; 35/35 C
[51] Int. Cl. ........................................... G09b 19/04
[58] Field of Search ...................... 179/1 D; 35/35 C

[56] References Cited
UNITED STATES PATENTS
3,358,390 12/1967 Korn ...................................... 179/1

Primary Examiner—Kathleen H. Claffy
Assistant Examiner—E. S. Kemeny
Attorney, Agent, or Firm—Robert E. Burns; Emmanuel J. Lobato; Bruce L. Adams

[57] ABSTRACT
An electro-acoustic speech training device and a speech training method for use with persons having speech impediments. The device is provided with a transducer for converting a subject's speech into voice electrical signals. The output of the transducer is amplified by a preamplifier and filtered selectively by a therapist. The filtering is accomplished by one of two high pass filters which serves to attenuate the low frequencies of the voice electrical signals. One of the filters is fixed and has a sharp cutoff with a cutoff frequency between 6,000–8,000 Hz while the other filter has adjustable frequency response characteristics. The output from either filter or the unfiltered preamplifier output is selectively amplified by a pair of variable gain amplifiers which drive two pairs of headsets for use by the subject and the therapist. The subject listens to filtered voice electrical signals corresponding to his speech for between six to twelve one hour sessions. During these sessions the filtering is accomplished by the fixed filter. This process is repeated during the first half hour of the next ten sessions while during the second half hour of the sessions the voice electrical signals are filtered by the variable filter. During the final twenty or more sessions the subject listens to the voice electrical signals filtered only by the variable filter. During the treatment the therapist adjusts the variable filter's frequency characteristics to values appropriate to the subject's progress.

7 Claims, 2 Drawing Figures

SPEECH-TRAINING DEVICE

BACKGROUND OF THE INVENTION

This invention relates generally to training devices and more particularly to speech training devices and a method for speech training of those having speech defects.

Devices are known for training of those with impediments that affect speech. The impediments may be those affecting the voice or hearing of a subject or patient. The known devices are electro-acoustic in nature and are generally made of a series configuration of an input microphone, into which the subject speaks, connected to a preamplifier to which is connected parallel filters applying their output to an amplifier to which are connected earphones worn by the subject. The subject can switch in or out various filter combinations and listen to this voice as the output voice signal is filtered.

These known voice training devices do not have optimum filter characteristics for carrying out their function.

SUMMARY OF THE INVENTION

It is a principal object of the invention to provide an electro-acoustic speech training device that filters the subject's speech in an optimum manner to maximize the therapeutic effects of the device.

Another object is to provide a method of correcting speech defects.

Another object of this invention is to provide a speech training device and a speech training method for correcting dysphasia, aphasia, deaf-muteness, and like speech impediments.

In the electro-acoustic speech training device according to the invention, transducer means are provided comprising a tape recorder and a microphone for developing an electrical voice signal corresponding to the subject's voice in the device. A preamplifier connected to the transducer means amplifies the electrical signals and applies them to a plurality of filters controlled by filter switches. Each filter switch provides means for connecting a given filter to the preamplifier's output thereby allowing the therapist to select a filter of suitable characterization to process the electrical signals. A first amplifier switch provides means for connecting the outputs of the filters to two variable gain amplifiers, and a second amplifier switch provides means for connecting the preamplifier's output directly to the two variable gain amplifiers. Circuit means connect the two amplifiers to a first headset used by the subject and visual indicating means in series with the circuit indicate the speech signal strength to the first headset. An amplifier select switch, operable to a first operating position, connects each earpiece of a second headset used by the therapist to monitor the speech signal, to an amplifier. In a second operating position the amplifier select switch connects both earpieces of the second headset to one amplifier.

Other objects and advantages of the speech training device and training method in accordance with the invention will appear from the following description of an example of the invention, and the novel features will be particularly pointed out in the appended claims.

DESCRIPTION OF THE PREFERRED EMBODIMENT

Figure 1:
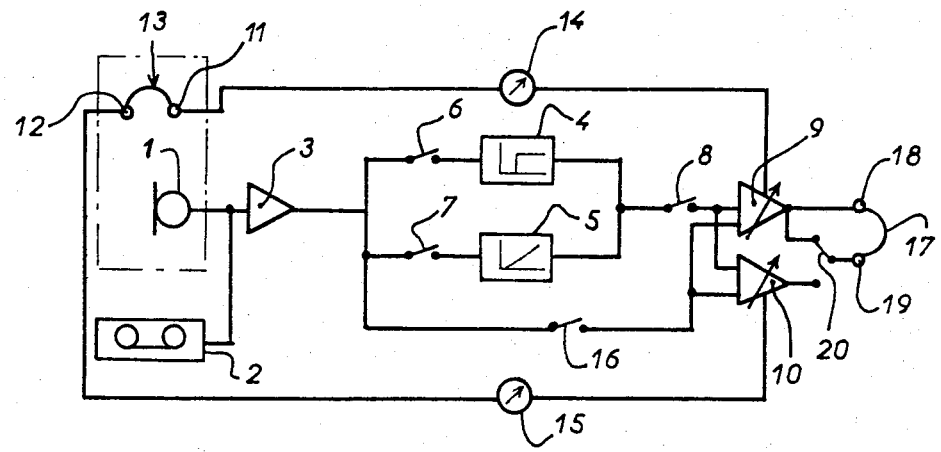
FIG. 1 is a schematic circuit diagram of an electro-acoustic speech training device embodying the invention.

A schematic circuit diagram of an electro-acoustic speech training device embodying the invention is illustrated in FIG. 1. A microphone 1 generates electrical signals representative of the subject's speech input thereto and a tape recorder 2 is used to play prerecorded tapes of samples of the subject's speech to generate electrical signals corresponding to the subject's speech. A preamplifier 3 amplifies the voice electrical signals from the microphone 1 or the tape recorder 2 depending on which is in use at the time. Filter switches 6 and 7 are controlled by the therapist and are used to connect either filter 4 or filter 5 to the output of the preamplifier 3. A first amplifier connecting switch 8 connects the outputs of filters 4, 5 to the inputs of a pair of variable gain amplifiers 9, 10, and a second amplifier connecting switch 16 connects the output of preamplifier 3 to the inputs of amplifiers 9, 10.

A first headset 13, comprising earpieces 11, 12 are connected to amplifiers 9, 10 by means of circuits containing voltmeters 14 and 15 in series with earpieces 11, 12 and amplifiers 9,10 respectively. Headset 13 is used by the subject to hear his speech after it has been filtered or in the unfiltered state and voltmeters 14, 15 provide means for monitoring the levels of the electrical voice signal received by the headset 13. An amplifier selecting switch 20 connects a second headset 17, used by the therapist, comprising earpieces 18, 19 to the outputs of amplifiers 9,10. Amplifier select switch 20 is operable to a first operating position whereby it connects both earpieces 18, 19 to the output of amplifier 9, and to a second operating position whereby it connects earpiece 18 to the output of amplifier 9 and earpiece 19 to the output of amplifier 10.

Figure 2:
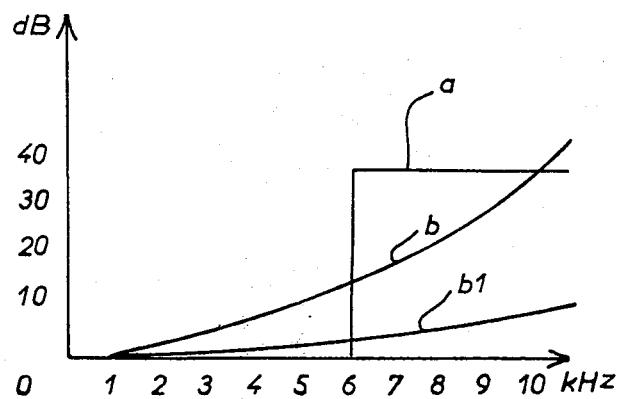
FIG. 2 is a graph of filter response curves of the filters used in the speech training device of FIG. 1.

The filters 4, 5 are high pass filters used to selectively filter the voice electrical signals to remove the low frequencies therefrom. The selection of the appropriate filter is made by the therapist according to the progress of the subject. The frequency response characteristics of filters 4, 5 are illustrated in FIG. 2. The filters' frequency response curves are plotted on a set of axes with the abscissa corresponding to frequency measured in kiloHertz and the ordinate corresponding to the relative amplitude of the filter output measured in decibels. Filter 4 is a high pass filter with a sharp cut-off frequency whose frequency response characteristics are represented by curve a. The cut-off frequency of filter 4 is shown to be 6KHz, however, a cut-off frequency between 6KHz to 8KHz will produce satisfactory results. Filter 4 attenuates frequencies in the voice electrical signals below the filter cut-off frequency by 40dB below the level it attenuates frequencies above the cut-off frequency. Filter 5 is a high pass filter with variable frequency response characteristics. Curves b and b1 illustrate the limits between which its characteristics can be voiced. At a frequency between 800 to 1,500 Hz filter 5's response is substantially at its minimum and increases gradually at its greatest rate to 40dB above its minimum response at 10KHz and at its minimum rate to 10dB above its minimum response at 10KHz.

Subjects with average hearing characteristics require filter 4 to have an attenuation of 70dB at frequencies below its cut-off frequency, and subjects with certain hearing disorders that exhibit hypersensitivity to sound require 90dB attenuation at frequencies below the filter cut-off frequency. The physical realization of such filters in expensive and difficult to achieve.

In order to obtain these desired characteristics filter 4 is constructed from four filter sections connected in series. The first filter section is a high pass sharp cut-off filter with a cut-off frequency of approximately 7,500 Hz, a form factor $m=0.6$ and a rejection pole at 6,000 Hz. The second and third filter sections have a cut-off frequency of 7,500 Hz and a form factor $m=1.0$, and the fourth filter section has a cut-off frequency of 7,500 Hz, a form factor $m=0.77$, and a lower rejection pole at approximately 4,500 Hz.

The treatment of language defects is accomplished by the following procedure. First, the subject listens to his voice after it has been filtered by filter 4. This is done by listening at headset 13 to a prerecorded sample of his speech played back on tape recorder 2 or by having the subject speak directly into microphone 1. Filter switch 6 is closed, filter switch 7 is open, first amplifier connecting switch 8 is closed and second amplifier connecting switch 16 is open. This phase of treatment lasts for from 6 to 12 1-hour sessions. The duration of this phase of the treatment is determined by the therapist, based on the observed progress of the subject.

During the next ten sessions filter 4 is used to filter the subject's speech during the first — half hour of the session, and filter 5 is used to filter the subject's speech during the second half hour of the session. The frequency response characteristics of filter 5 are set by the therapist to characteristics appropriate to the subject's progress. Initially, filter 5 is operated with frequency characteristics shown by curve $b$ in FIG. 2, and as the treatment progresses filter 5 is adjusted so that its frequency characteristics approach the curve $b1$.

The treatment is completed with twenty or more 1 hour sessions during which only filter 5 is used to filter the subject's speech. Throughout this series of treatments the therapist selects the frequency response characteristics of filter 5 most appropriate to the subject's progress. This process has proved to be an effective treatment for any language disorder.

What I claim and desire to secure by letter patent is:

1. A speech training device comprising, an input transducer for converting sounds of human speech to corresponding electrical signals, a first and second filter, first and second output transducers for converting said electrical signals to sounds, and circuit means for alternatively connecting said filters to said input transducer for filtering said electrical signals and for alternatively connecting filters to said first and second output transducers for rendering said filtered electrical signals audible, said first filter comprising a high pass filter with a sharp cutoff frequency and a cutoff frequency range in the order of between 6,000 to 8,000Hz and an attenuation below its cutoff frequency of about 40dB greater than its attenuation above its cutoff frequency, said second filter comprising a variable high pass filter with variable frequency response characteristics having its maximum attenuation at frequencies in the order of between about 800Hz to 1,500Hz and below and gradually increasing at a controllably variable rate to about between 10dB and 40dB above its maximum attenuation at about 10,000 Hz.

2. A speech training device comprising, an input transducer for converting sounds of human speech to corresponding electrical signals, first and second filters, first and second output transducers receptive of the outputs of the filters for converting said electrical signals to sounds, and circuit means for alternatively connecting said filters to said input transducer for filtering said electrical signals, and for alternatively connecting said filters to said first and second output transducers including means for rendering said filtered electrical signals audible, said first filter comprising a fixed high pass filter with a sharp cutoff frequency for attenuating the low frequencies in said electrical signals corresponding to the low frequencies in human speech, said second filter comprising a variable high pass filter having its attenuation gradually increasable at a controllably variable rate from its minimum value to its selectable maximum value for controllably attenuating the low frequencies in said electrical signals corresponding to the low frequencies in human speech.

3. In a speech training device according to claim 2, in which said input transducer comprises a tape recorder for converting prerecorded human speech to corresponding electrical signals and a microphone for converting sounds of human speech to corresponding electrical signals, a preamplifier for amplifying said electrical signals, and circuit means connecting said tape recorder and said microphone to said preamplifier.

4. In a speech training device according to claim 2, in which said first and second output transducers comprise a first and second variable gain amplifier for amplifying said filtered electrical signals, a first headset comprising a first and second earpiece, a first and second voltmeter, circuit means connecting said first earpiece of said first headset and said first voltmeter to said first amplifier, and connecting said second earpiece of said first headset and said second voltmeter to said second amplifier thereby to generate sounds corresponding to said filtered electrical signals, said voltmeters providing signal monitoring means to indicate settings of a gain control of said amplifiers, a second headset comprising two earpieces, and circuit means connecting said second headset to said amplifiers, including an amplifier select switch operable to a first operative position connecting both said earpieces of said second headset to said first amplifier and operable to a second operative position connecting one said earpiece of said second headset to said first amplifier and the other said earpiece of said second headset to said second amplifier.

5. In a speech training device according to claim 2, in which said first filter comprises four filter sections connected in series, said first filter section comprising a high pass filter having a form factor $m=0.6$, a rejection pole at approximately 6,000Hz and a cutoff frequency of approximately 7,500 Hz, said second and third filter sections comprising high pass filters having form factors $m=1.0$ and a cutoff frequency of approximately 7,500 Hz, and said fourth filter section having a form factor $m=0.77$, a lower rejection pole at approximately 4,500Hz and a cutoff frequency of approximately 7,500 Hz, providing attenuation to frequencies of said electrical signals below approximately 7,500Hz.

6. A speech training method comprising, converting sounds of a subject's speech to corresponding electrical signals, filtering said electrical signals to attenuate the low frequency components of said electrical signals corresponding to the low frequency components of said subject's speech, converting said filtered electrical signals to audible sounds, and submitting said subject to a first series of sessions during which the subject listens to sounds of his speech with the speech frequencies below a fixed cutoff frequency sufficiently attenuated to preclude comprehension of said speech by the subject, a second series of sessions during which the subject listens to said sounds of his speech alternatively filtered in the same manner as during said first series of sessions, and filtered with said speech frequencies attenuated according to frequency attenuation characteristics selected by a therapist to correspond to said subject's progress, and a third series of sessions during which said subject listens to said sounds of his speech filtered according to said frequency attenuation characteristics selected by said therapist to correspond to said subject's progress.

7. In a speech training method according to claim 6, in which said electrical signals are filtered during said first series of sessions to attenuate frequencies of said electrical signals below a sharp cutoff frequency by about 40dB more than frequencies of said electrical signals above said cutoff frequency are attenuated, said cutoff frequency being on the order of between 6,000 Hz to 8,000 Hz, and in which said electrical signals are filtered during said second series of sessions alternatively in the same manner as during said first series of sessions or said electrical signals are filtered to attenuate frequencies of said electrical signals at a frequency on the order of between 800Hz to 1,500Hz and below a given maximum value and to attenuate frequencies above frequencies at which said maximum attenuation occurs by a value gradually decreasing from the maximum value of attenuation at a rate selected by said therapist according to said subject's progress, said attenuation having a possible range of values at 10,000Hz of between about 10dB to about 40dB less than said maximum value of attenuation, and in which said electrical signals are filtered during said third series of sessions by values selected by said therapist in the same manner as during said second series of sessions.

* * * * *